United States Patent [19]

Meehan

[11] 4,047,078
[45] Sept. 6, 1977

[54] PULSE DIFFERENTIATING HIGH VOLTAGE SHUTDOWN CIRCUIT

[75] Inventor: David H. Meehan, Chicago, Ill.

[73] Assignee: Zenith Radio Corporation, Glenview, Ill.

[21] Appl. No.: 691,744

[22] Filed: June 1, 1976

[51] Int. Cl.² ............................................. H01J 29/70
[52] U.S. Cl. ..................... 315/411; 358/190
[58] Field of Search ........................ 315/411; 358/190; 321/2

[56] References Cited

U.S. PATENT DOCUMENTS

| 3,885,201 | 5/1975 | Fernsler | 315/411 |
| B 422,156 | 3/1976 | Yasumatsuya et al. | 315/411 |

FOREIGN PATENT DOCUMENTS

| 2,144,827 | 3/1973 | Germany | 315/411 |

Primary Examiner—Maynard R. Wilbur
Assistant Examiner—T. M. Blum
Attorney, Agent, or Firm—Roy A. Ekstrand

[57] ABSTRACT

A television receiver includes a conventional tri-color cathode ray tube display system having horizontal and vertical scansion systems. Conventional signal receiving and processing circuitry recovers picture, sound and scansion synchronizing information. A high voltage detector includes a high pass filter, couples to the horizontal scansion amplifier, differentiating the horizontal retrace pulse to detect both amplitude and duration changes therein. A diode rectifies the derivative signal which is then filtered to produce a high voltage error signal. A PNP, NPN transistor pair configured to form a switch analogous to a silicon controlled rectifier responds to a detected excess of high voltage and loads down the operating supply to the horizontal scansion oscillator to terminate high voltage generation. The transistor pair accommodates a degenerating network to better reject false triggering.

5 Claims, 1 Drawing Figure

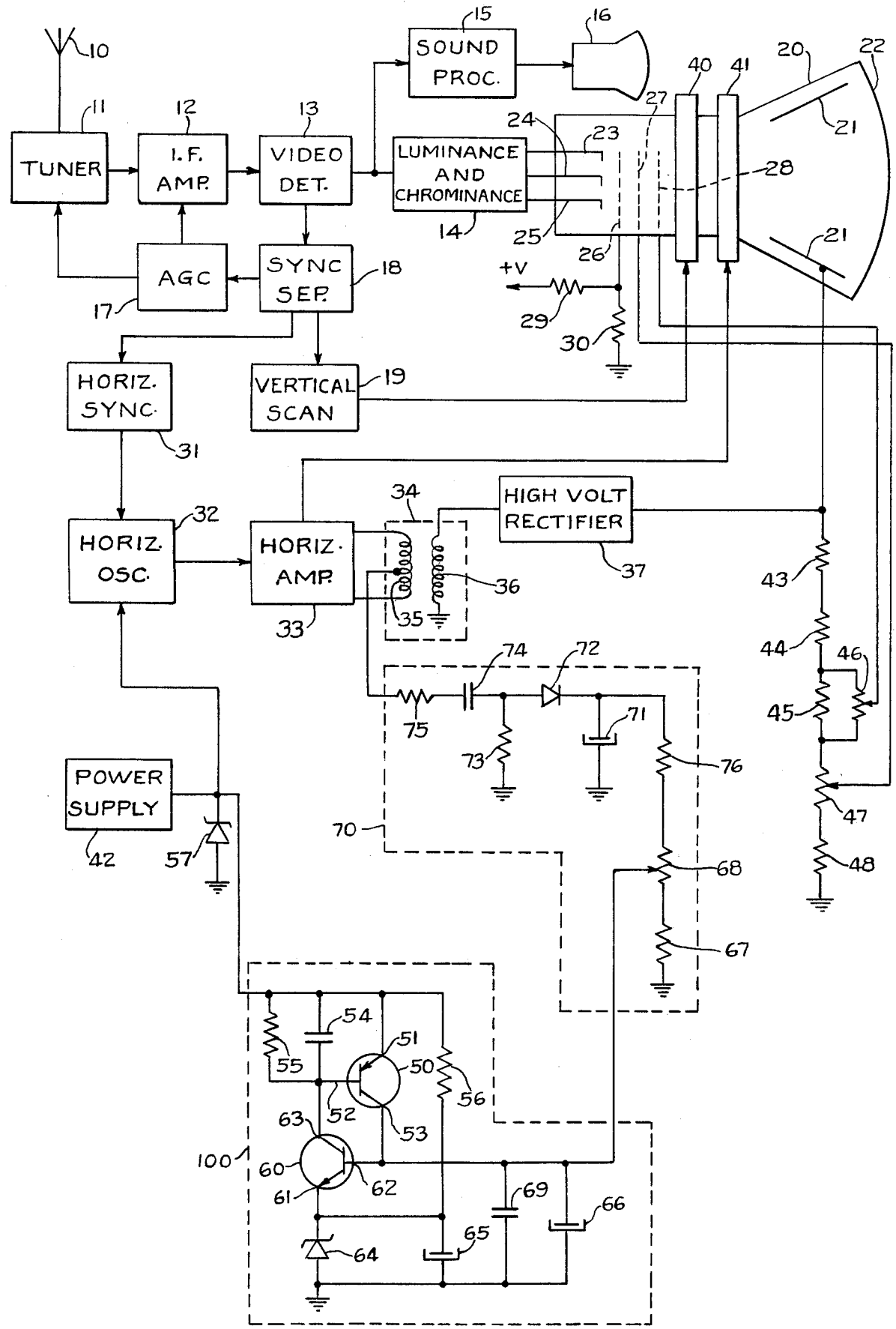

PULSE DIFFERENTIATING HIGH VOLTAGE SHUTDOWN CIRCUIT

BACKGROUND OF THE INVENTION

This invention relates generally to television high voltage systems and particularly to shutdown circuits used therein.

In a typical color television receiver scansion and display system, a cathode ray tube (CRT) display device includes a trio of electron beam sources which are directed at a tri-color phosphor viewing screen. Horizontal and vertical scansion circuitry within the receiver locally generate scansion signals which are synchronized to reference information within the received signal. The scansion signals are applied to an electromagnetic deflection yoke positioned on the envelope of the CRT producing vertical and horizontal scansion of the viewing screen. The cathode ray tube requires a number of operating potentials the highest of which is an accelerating potential of approximately 25 to 30 kilovolts which is generally referred to as the high voltage. This potential is applied to an electrode within the CRT to accelerate the electrons within the directed beams to an energy level sufficient to cause light emission by impacted phosphor areas and illumination of the viewing screen.

In the great majority of television receivers the horizontal scansion system produces this high voltage in addition to the horizontal scansion signals. Horizontal scansion includes a relatively slow scan deflection of the electron beams followed by a relatively fast retrace deflection in which the beams are deflected back to the "start" of scan position. The scansion signal producing this retract comprises a short duration high amplitude pulse which is also used to generate CRT high voltage. Most receivers use a tertiary winding on the horizontal transformer together with a rectifier or voltage multiplier to raise the voltage to sufficient level for high voltage production. In the former system the tertiary transformer winding ouput is rectified directly while in the latter a familiar capacitor diode matrix is used to boost and rectify the voltage.

It is generally desirable for purposes of picture sharpness, brightness and color rendition to maintain a relatively high accelerating potential. However, cathode ray tubes have a tendency to produce prohibitive amounts of radiation when excessive high voltage is used. As a result care must be taken to assure that the accelerating potential does not exceed that radiation producing threshold.

The problems of radiation production in modern television receiver cathode ray tubes are made more difficult by the improved regulation of operating supply and high voltage generating circuitry. Modern scansion circuitry is able to sustain great overloads and still maintain high voltage ouput. Because these improved systems are capable of producing greater power levels they are not in any real sense "self-limiting". Therefore, while providing considerable advantages in picture quality and other performance criteria, such "stronger" high voltage supplies also have a greater capacity for continued operation even though high voltage has somehow exceeded the radiation producing threshold.

It is well known to employ high voltage shutdown circuitry which monitors the accelerating potential or some related voltage and disables the accelerating potential circuitry in the event of excess output. Such systems may include threshold circuitry detecting either the high voltage itself or a voltage derived therefrom such as that used for CRT focus. Another alternative uses circuitry detecting the amplitude of the retrace portion of the horizontal scansion signal which, of course, varies in a predictable relationship with CRT high voltage. In any case, the most typical operation provides complete shutdown of the high voltage system in the event of an excess.

Because such shutdown circuits may be required to respond to relatively small high voltage changes, it is desirable to maximize system sensitivity. However, the system must also be relatively insensitive to false triggering caused, for example, by CRT arcing, transitory noise as well as variations due to temperature drifts and components aging within the receiver circuitry. These two conflicting criteria may be reconciled to the extent that the portion of high voltage changes available to the system is maximized. It is desirable, therefore, to maximize the conversion efficiency of the high voltage detector in a shutdown circuit.

OBJECTS OF THE INVENTION

Accordingly, it is an object of the present invention to provide and improved high voltage shutdown circuit.

It is a more particular object of the present invention to provide an improved, high voltage shutdown circuit, which provides greater immunity to erroneous triggering.

SUMMARY OF THE INVENTION

In a television receiver having a cathode ray tube display device in which one or more electron beams are directed to a viewing screen, horizontal scansion means producing a scansion signal having a long duration trace portion and a short duration retrace portion causing the beams to scan the viewing screen from side-to-side, vertical scansion means causing a top-to-bottom progression of successive side-to-side scans and high voltage generating means producing an electron accelerating potential for the cathode ray tube from the short duration portion of said horizontal scansion signal, the improvement comprises high voltage disabling means for rendering the high voltage generating means inoperative when the accceleration potential exceeds a predetermined threshold. The disabling means includes detection means simultaneously responsive to variations in the amplitude and duration of the retrace portion of the horizontal scansion signal.

BRIEF DESCRIPTION OF THE DRAWING

The FIGURE is a partial block schematic detail representation of a color television receiver constructed in accordance with the present invention.

DESCRIPTION OF THE PREFERRED EMBODIMENT

The FIGURE shows a partial block diagram, partial schematic representation of a television receiver in which a tuner 11 receives an information bearing signal incident upon antenna 10 which is converted to an intermediate frequency signal and coupled to an intermediate frequency amplifier 12 which in turn amplifies the signal to a level sufficient to drive a video detector 13. The modulation components of picture, sound and deflection synchronization information are recovered from the intermediate frequency signal by detector 13 and are amplified to a luminance and chrominance processor 14 which in turn drives the cathode electrodes of a conventional tri-color CRT 20.

The ouput of video detector 13 is also applied to a sound processor 15, which in turn drives a speaker 16, and a sync separator 18. The latter recovers the horizontal and vertical scan snychronization pulses. Sync separator 18 also separates the horizontal and vertical scansion synchronizing pulses. The former are applied to a vertical scan system 19 which provides a vertical scansion signal driving a vertical deflection yoke 40 situated on CRT 20. The latter are applied to a horizontal sync system 31. Sync separator 18 also drives an automatic gain control (AGC) voltage generator 17 which by conventional amplitude comparison techniques produces a control voltage which is fed back to amplifier 12 and tuner 11 providing a constant output signal level at detector 13.

A horizontal oscillator 32 generates a horizontal rate scansion signal which is coupled to a horizontal output amplifier 33 raising the scan signal to a sufficient level to drive a primary winding 35 of a horizontal deflection transformer 34. The output of horizontal amplifier 33 is also coupled to a horizontal deflection yoke 41 situated on CRT 20.

Secondary winding 36 of transformer 34 has one end connected to a high voltage rectifier 37 and the other to ground. The output of high voltage rectifier 37 is connected to an accelerating electrode 21 within CRT 20. High voltage transformer 34 and high voltage rectifier 37 are intended to be exemplary of conventional horizontal deflection and high voltage producing circuitry. Transformer 34 is representative of horizontal output transformer commonly used in color television receivers. High voltage rectifier 37 includes the familiar diode capacitive multiplier matrix. Accordingly, secondary winding 36 produces a driving pulse which is "multiplied" through the familiar action of rectifier 37 to produce an appropriate CRT accelerating voltage.

In the alternative, the equally familiar series rectifier may be used in which case secondary winding 36 would be altered to produce an output pulse of greater amplitude directly producing a rectified high voltage appropriate for aplication to CRT electrode 21. In eiher case the function of horizontal amplifier 33 and high voltage rectifier 37 with respect to the present invention is the same and will be discussed in detail below.

A resistive voltage divider comprising the series combination of resistors 43, 44, 45, potentiometer 47, and resistor 48 is connected between high voltage electrode 21 and ground. In addition a potentiometer 46 is connected in parallel with resistor 45. The voltage divider thus formed provides a source of several operating potentials for CRT 20. The movable contact of potentiometer 46 is connected to a focus electrode 38 of CRT 20 providing a variable source of focus voltage. Similarly, the movable contact of potentiometer 47 is connected to a screen gride electrode 27 of CRT 20.

CRT 20 is a unitized gun type picture tube in which individual cathode electrodes 23, 24 and 25 are connected to luminance and chrominance processor 14. A control grid electrode 26 is common to all the three cathodes and is maintained at a constant potential by a voltage divider formed by resistors 29 and 30 connected between +V and ground. It should be clear that the present invention may be used with any of the presently used cathode ray tube types.

A power supply 42 is shown coupled to shutdown circuit 100 (indicated by dashed lines) and horizontal oscillator 32. For clarity power supply connections to the remaining portions of the receiver are not shown. It should be understood, however, that each of the receiver portions (shown in block form) are powered by a source of operating power in accordance with well known receiver fabrication techniques.

The output of power supply 42 is connected to horizontal oscillator 32 and to the cathode electrode of a Zener diode 57 which has its anode electric connected to ground. Zener 57 performs the power supply regulation function by prohibiting the output voltage of supply 42 from exceeding the reverse breakdown voltage of Zener 57. Shutdown circuit 100 includes a PNP transistor 50 having an emitter electrode 51 connected to the output of power supply 42, a base electrode 52, and a collector electrode 53, and and NPN transistor 60 having an emitter electrode 61 connected to ground by a Zener diode 64, a base electrode 62 connected to collector 53, and a collector electrode 63 connected to base 52. A parallel combination of a resistor 55 and capacitor 54 couples the junction of base 52 and collector 63 to the output of power supply 42. Emitter 61 is also coupled to ground by a capacitor 65 and to the output of power supply 42 by a resistor 66. Base 62 is connected to ground by capacitors 66 and 69 and to the movable contact of potentiometer 68.

High voltage detector 70 includes a series combination of a resistor 75 and a capacitor 74 coupling one end of winding 35 to the anode of a diode 72. A resistor 73 couples the junction of diode 72 and capacitor 74 to ground. The anode of diode 72 is coupled to a filter capacitor 71 and one end of a voltage divider formed by the series combination of a resistor 76, potentiometer 68, and a resistor 67.

The operation of the horizontal scansion system shown (with the exception of shutdown circuit 100 and high voltage detector 70) is conventional in that a locally generated scansion signal produced by oscillator 32 is applied to horizontal amplifier 33 which produces a high energy horizontal scansion signal applied to yoke 41 and to the primary of the horizontal sweep transformer 34. The high amplitude retrace portion of the horizontal scansion signal is coupled to secondary 36 of transformer 34 producing a high voltage AC signal which is converted by high voltage rectifier 37 to an accelerating potential suitable to drive CRT 20.

As is known, the high voltage produced will vary with the amplitude of the retrace portion of the horizontal scan signal. If for example effects of temperature or aging change components values within the horizontal scansion circuitry so as to increase the retrace signal a greater AC pulse voltage will be applied to rectifier 37 and the accelerating potential will increase. If these component variations accumulate, substantial changes in high voltage may result. Of course, if components actually fail the possibility of excessive high voltage may become acute.

The discussion thus far has been directed primarily at component effects on amplitude, however, in the typical horizontal scansion system such as represented by amplifier 33, transformer 34 and rectifier 37 a number of frequency sensitive characteristics exist. For example, windings 35 and 36 are "tuned" in accordance with well-known receiver practices. Similarly, circuitry within amplifier 33 includes several resonant networks. Such frequency sensitivity in television horizontal scansion systems is well-known and need not be further described. Suffice it to say that it is a general characteristic of such scansion systems that component failure or value changes in one or more of these resonant networks is likely to change circuit tuning.

Under most conditions horizontal sync means 31 will compensate for resonance changes within the horizontal scansion system to the extent that a useable display is maintained. However, such changes in system tuning often result in a reduction in pulse width of the retrace signal which is generally accompanied by a corresponding increase in retrace pulse amplitude. In other words, if components within these resonant networks fail in a manner which causes a reduction in retrace pulse duration a corresponding increase in receiver high voltage will result.

Turning now to the operation of detector 70 and shutdown circuit 100, the retrace portion of the horizontal scansion signal is coupled by resistor 75 to a high pass filter or differentiating network formed by a capacitor 74 and resistor 73. The differentiated retrace signal appearing at the junction of capacitor 74 and resistor 73 is rectified by diode 72 and filtered by capacitor 71 to produce a uniform DC control voltage. In accordance with an important aspect of the present invention it should be noted that the DC voltage stored in filter capacitor 71 varies with both the amplitude and duration of the retrace signal. As a result the voltage variations recovered by detector 70 reflect changes of pulse amplitude and duration which are cumulative That is, if a receiver component variation or failure causes the duration of the pulse to decrease, the amplitude of its derivative also increases causing an additional increase in error voltage recovered beyond that due solely to detection of amplitude changes. It should also be noted that while a first derivate signal is used in the described embodiment many other signals bearing derivative relationships to the retrace pulse may be used without departing from the spirit of the invention.

The voltage stored on capacitor 71 is applied resistors 76 and 67 and potentiometer 68. The moveable contact of the potentiometer permits setup adjustment of the control voltage applied to shutdown circuit 100. Circuit 100 responds to an excessive voltage at the moveable contact of potentiometer 68 (indicating prohibitive accelerating potential) and activates a high current shunt path between the output of power supply 42 and ground. This shunt conduction overcomes the regulation of power supply 42 and the operating supply available to oscillator 32 is substantially reduced causing it to cease oscillation.

In the system shown Zener diode regulation of the output voltage of power supply 42 is employed. As mentioned, such a device regulates voltage due to its avalanche or reverse breakdown characteristic. Once conducting in the reverse direction, the voltage across the Zener will not substantially exceed the breakdown potential. However, the Zener regulator shown will not prohibit reductions of power supply voltage below the breakdown voltage (the mechanism by which shutdown circuit 100 operates). For this reason it is advantageous to use such regulation in the described embodiment. It should be obvious, however, that the use of different regulator construction with corresponding regulation defeating systems can be envisioned without departing from the spirit of the present invention. Regardless of the regulator used the degree of supply reduction during shutdown is selected such that oscillator 32 ceases to produce a horizontal scansion signal which, of course, terminates the production of acceleration potential.

Once activated, the shutdown circuit "latches," that is, maintains the termination of high voltage notwithstanding changes in the accelerating potential. This characteristic is important since the accelerating potential will decrease once the horizontal oscillator is disabled. But for such circuit latching, receiver operation could be restored without removing the failure cause. Or perhaps worse the receiver would vascillate between shutdown which would reduce high voltage which in turn would turn off the shutdown circuit causing a restoration of high voltage and so on.

Turning now to the operation of circuit 100 in greater detail, the combination of PNP transistor 50 and NPN transistor 60 forms the well known two-transistor analog of a silicon controlled rectifier (SCR). Accordingly, a positive voltage at base 62 which exceeds the voltage at emitter 61 by approximately 0.6 volts causes transistor 60 to conduct. The conduction of transistor 60 produces a current flow through resistor 55 establishing a lower potential at base 52 than that of emitter 51 causing transistor 50 to conduct. The transistor pair forms a regenerative switch in that conduction of transistor 50 drives base 62 more positive causing transistor 60 to conduct heavily further increasing transistor 50 conduction. The conduction of transistors 50 and 60 essentially couples Zener 64 to the output of power supply 42. Zener 64 has a reverse breakdown substantially lower than Zener 57 and when coupled to power supply 42 by way of transistors 50 and 60, it maintains the output voltage of power supply 42 at a substantially reduced voltage. The reduced voltage is, of course, low enough to cause oscillator 32 to cease producing signals.

As mentioned above, the voltage at the movable contact of potentiometer 68, which changes due to variation of either or both amplitude and duration of the retrace signal thereby serving to indicate change in acceleration potential, determines the voltage at base 62. Emitter 61 is maintained at a substantially constant potential by Zener 64, resistor 66 and capacitor 65. The use of Zener 64 in this manner permits emitter 61 to be maintained at a high enough potential to avoid false triggering by noise energy incident on base 62 or the leads coupled thereto without prohibitive reduction of the grain of transistor 60. It should be noted that a more substantial offset of emitter 61 and therefore greater threshold of transistor 60 conduction is made possible due to the increased signal recovery by detector 70. That is, the increased recovery of retrace pulse changes by detector 70 can overcome greater affects and still activate transistor 60. This greater threshold in turn furthers minimizes the likelihood of false triggering. Because the voltage at emitter 61 is maintained at a constant, voltage changes at base 62 directly after the base-emitter voltage of transistor 60, an increase in accelerating potential sufficient to overcome the threshold and raise base 62 more than 0.6 volts with respect to emitter 61 turns on transistor 60 and activates the shutdown circuitry. Capacitors 66 and 69 filter the voltage at base 62 which additionally improves circuit immunity to "noise" and other "false" triggers.

In addition to the noise and false triggering rejection achieved by the use of emitter 61 offset and capacitors 66, 65 and 74, the switching action of transistors 50 and 60 are degenerated, that is, "slowed down" by the parallel combination of resistors 55 and capacitor 54. In total these safeguards provide excellent false trigger rejection. However, in the event the circuit is falsely triggered, the voltage at emitter 51 may be removed "unlatching" the shutdown circuit by simply turning off the receiver for a moment and then turning it back on.

What has been described is a novel high voltage shutdown system for use in a television receiver. The system simultaneously achieves reliable fast shutdown protection for fault conditions of excessive accelerating potential and improved immunity to false trigger signals. In addition to the advantage of increased detection recovery the system uses a switching transistor pair which permits control of switching speed and may be triggered at either transistor base yielding increased performance and flexibility.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. In a television receiver having a cathode ray tube display device in which one or more electron beams are directed to a viewing screen, horizontal scansion means producing a scansion signal having a long duration trace portion and a short duration retrace portion causing said beams to scan said viewing screen from side-to-side, vertical scansion means causing a top-to-bottom progression of successive side-to-side scans and high voltage generating means producing an electron accelerating potential for said cathode ray tube from said short duration retrace portion of said horizontal scansion signal, the improvement comprising:

high voltage disabling means for rendering said high voltage generating means inoperative when said accelerating potential exceeds a pedetermined threshold including detection means simultaneously responsive to variations in the amplitude and duration of said retrace portion of said horizontal scansion means.

2. High voltage disabling means as set forth in claim 1, wherein said detection means include:

differentiating means, coupled to said horizontal scansion means, producing a signal substantially equal to the derivative of said retrace portion of said horizontal scansion signal.

3. High voltage disabling means as set forth in claim 2, wherein said differentiating means include a high pass filter network and wherein said detection means include:

rectifying means, coupled to said high pass filter network, converting said derivative signal to a single polarity control voltage.

4. High voltage disabling means as set forth in claim 3 wherein said detecting means include:

a filter capacitor coupled to said rectifying means converting said single polarity control voltage to a substantially uniform voltage.

5. High voltage disabling means as set forth in claim 4, wherein said rectifying means include:

a diode having an anode electrode coupled to said high pass filter network and a cathode electrode coupled to said filter capacitor.

* * * * *